Figure 1:
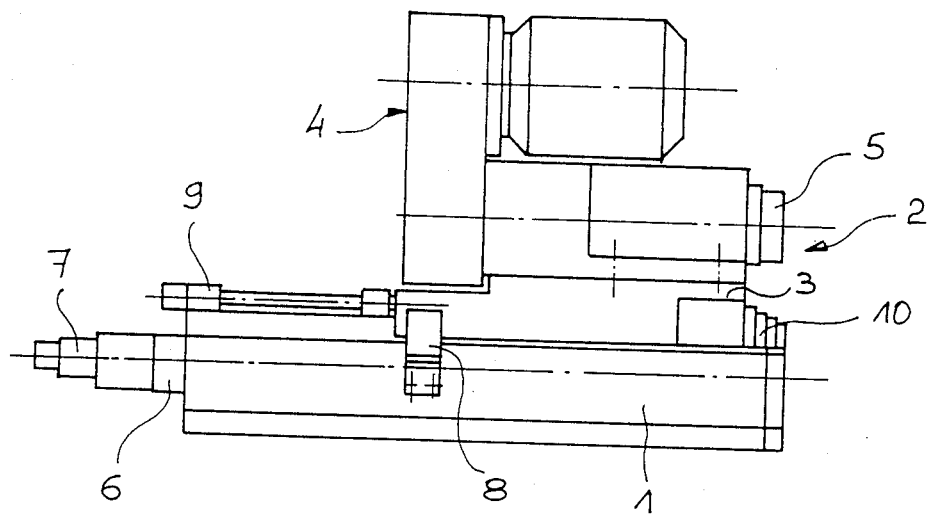

United States Patent [19]

Buessinger et al.

[11] Patent Number: 4,859,085
[45] Date of Patent: Aug. 22, 1989

[54] TRAVEL DEVICE FOR A MACHINE TOOL OR A TRANSFER MACHINE

[75] Inventors: Pierre Buessinger, Colmar-Wintzenheim; Pierre Colin, Wittenheim; Rene Rudolf, Morschwiller Le Bas, all of France

[73] Assignee: Somex S.A., France

[21] Appl. No.: 253,763

[22] Filed: Oct. 5, 1988

[51] Int. Cl.⁴ ............................................. F16C 29/06
[52] U.S. Cl. ........................................ 384/45; 384/99
[58] Field of Search ..................... 384/45, 44, 43, 99; 464/168

[56] References Cited

U.S. PATENT DOCUMENTS

| | | | |
|---|---|---|---|
| 4,614,382 | 9/1986 | Teramachi | 384/45 |
| 4,730,945 | 3/1988 | Luther et al. | 384/45 |
| 4,769,565 | 9/1988 | Teramachi | 384/45 |
| 4,773,770 | 9/1988 | Osawa et al. | 384/45 |

Primary Examiner—Lenard A. Footland
Attorney, Agent, or Firm—Davis, Bujold & Streck

[57] ABSTRACT

The invention relates to a travel device in a machine tool having a travel slide (2) which supports a machining unit (4) and which is mounted on a frame by means of runners having balls. Frame (1) is fitted with two parallel rails (12) having a wide-mouthed groove (13) on their outer face. A base plate (3) of the slide (2) has on its lower face four runners guided by balls (15) comprising a section where the balls (16) project so as to be engaged in the groove (13) of the rail. The runners (15) are protected from machining scraps. They are also prestressed by adjusting screws (24) so as to exert permanent pressure on the rails. Such a device can be used in all machine tools or transfer installations fitted with a travel slide.

8 Claims, 2 Drawing Sheets

TRAVEL DEVICE FOR A MACHINE TOOL OR A TRANSFER MACHINE

The present invention relates to a travel device for a machine tool or a transfer machine, comprising:

a frame provided with two parallel longitudinal components located on each side of a central passage and each provided with at least one longitudinal groove made in a lateral face located on the side opposite the other component, a slide mobile in travel, placed above said longitudinal components of the frame and provided with at least one pair of runners guided by balls and disposed opposite one another, each runner comprising a circuit of balls having a section along which the balls emerge laterally from the runner and are engaged in one of said grooves for guiding the slide, and means for displacing and positioning the slide along the frame.

Figure 3:
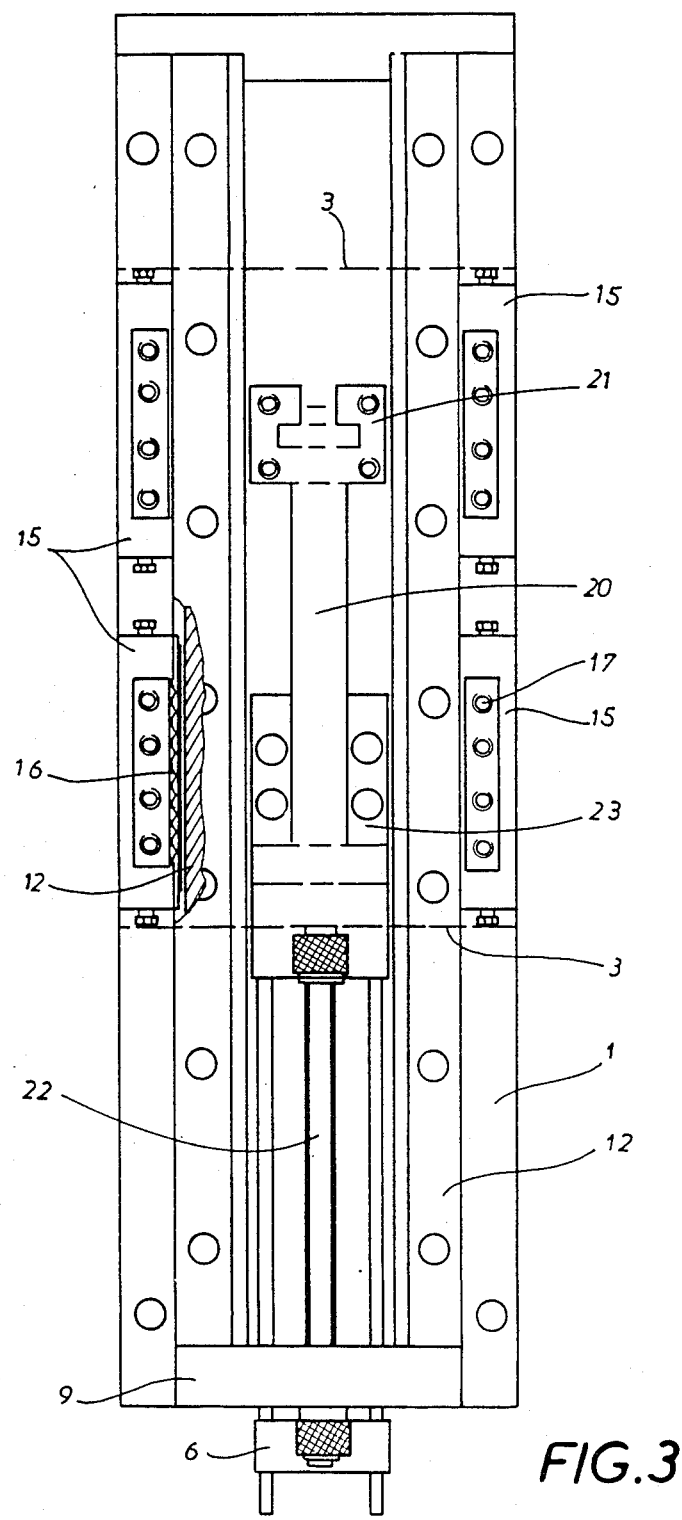

FIGS. 3 and 4 of patent application JP-A-137616 show a device of this type, with a frame having a U-shaped section which defines the central passage and which comprises, on the outer face of each branch of the U, a bearing groove for the balls of the slide. This slide has an inverted U-shaped section and it straddles the frame and covers its two branches and the central passage, in which its screw drive mechanism is located. The ball circuits are integrated into the two lateral branches of the slide, and the two grooves are simultaneously machined in the frame so as to have a very precise mutual positioning which removes the necessity for any subsequent adjustments to the guidance of the slide.

This sytem has the drawback of requiring relatively difficult and expensive machining. Moreover, if the bearing mechanisms suffer damage, which occurs fairly frequently as a result of swarf being able to remain in the bearing grooves of a machine tool, it is necessary to replace practically all the device. It is not even possible to compensate for wear in the device described, with the result that the accuracy of the guidance is limited in time.

Consequently the object of the present invention is to avoid these drawbacks by improving a travel device of this type so as also to ensure a long operating life, thanks to simple and relatively cheap constructive measures.

With this aim in view, the invention provides a travel device of the type mentioned in the preamble, characterised in that the said longitudinal components of the frame comprise two separate rails, detachably fixed on the frame, and in that the slide comprises control means for ensuring a prestressing of each runner guided by balls in the groove of the corresponding rail, towards the opposite runner.

The said lateral face of the rails is preferably at least approximately vertical. The two rails may advantageously have the same cross section, and this section may comprise the said groove on two opposite lateral faces of the rail. Thus the rail may be turned so that the second groove can be used should the first be damaged.

In an advantageous embodiment, the slide comprises two pairs of said runners guided by balls, the two runners situated on one side being designed so as to travel along the same groove. On the other hand, the slide preferably comprises a base plate under which the runners are fixed, whereas the rails extend beneath this upper plate which thus protects both the runners and the rails against falling scrap, for example by a machining head mounted on the base plate.

The displacement and positioning means of the slide preferably extend between the two rails. They may comprise in particular a hydraulic on pneumatic jack, or a screw and a ball nut fixed under the slide.

Figure 2:
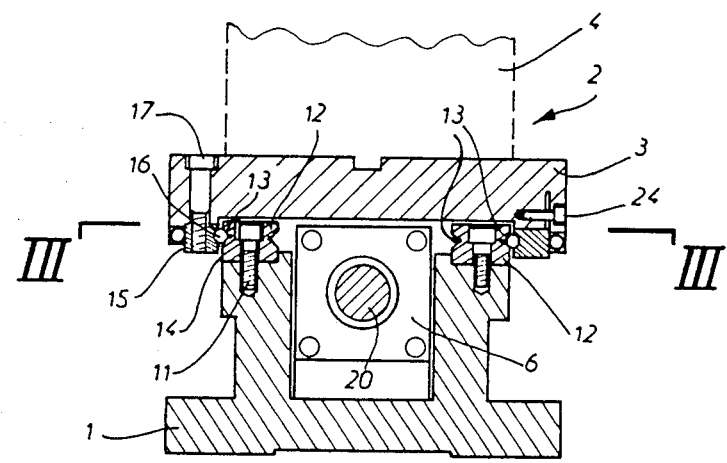

The characteristics and advantages of the present invention will be better shown in the following description of an embodiment, with reference to the attached drawing, in which:

FIG. 1 is a partial view in lateral elevation of a travel device in accordance with the invention, in which the slide bears a machining unit in a machine tool, FIG. 2 is a cross section showing the base of the slide and the part of the frame bearing said slide, and FIG. 3 is a plan view along line III—III of FIG. 2.

With reference to FIG. 1, the machine has a frame 1 along which there travels a slide 2 having a base plate 3 on which is mounted, for example, a machining unit 4 displaced into horizontal travel by the slide. The machining unit 4 may be fixed on base plate 3 by being oriented in any direction with respect to the direction of travel of the slide, or may be mobile on the slide, for example by pivoting or transversal travel. As known, such a unit generally has a motor and a tool head 5 to machine a piece borne by another part of the machine.

In order to displace and position the travel slide 2, in this embodiment there is provided a hydraulic or pneumatic jack 6, the shaft of this jack being connected to the slide, a known proportional control device 7 integrated into the rear floor of the jack, and a limit control housing 8 which cooperates, for example, with a magnetic rule integrated with slide 2. The slide is also provided with rear 9 and front mechanical stops, and also with a sheet-metal telescopic guard 10 covering the zone situated at the front of the slide, beneath the action zone of the machining unit. This guard is advantageously integrated into base 3 of the slide so that it is concealed there when the slide reaches the end of its travel, as shown by FIG. 1. This permits the avoidance of longitudinal displacement, which usually occurs between the nose of head 5 and the front end of frame 1. The other parts of the machine tool may be of a known type and are not shown.

The means for guiding and supporting the slide in its travel are shown in FIGS. 2 and 3. On frame 1 are fixed, by means of screws 11, two parallel rectilinear rails 12 having a substantially rectangular and symmetrical section, with longitudinal grooves 13 on their two vertical lateral faces. Opposite outer vertical faces 14 of rails 12, base plate 3 of slide 2 is provided, close to its lower face, with two pairs of runners guided by balls 15, with each pair being disposed opposite one another. These runners guided by balls are currently commercially available and contain a circuit of balls having a rectilinear section formed by a groove open partially on one lateral face of the runner, so that balls 16 partially emerge from this face and may thus be engaged in the groove 13 of corresponding rail 12. As each runner 15 is fixed securely to base plate 3 by screws 17, this at the same time enables the weight of slide 2 to be supported and it to be guided accurately. Runners 15, and in particular the zones where their balls are apparent, are well protected from machining swarf under base plate 3. Rails 12 may advantageously be commercially available profiles and thus relatively cheap. Their grooves 13 have a section shaped like a V or an arc of a circle, and waste and dirt can not easily settle therein, even outside zones covered by the slide and by guard 10.

The slight space occupied by rails 12 leaves adequate space between them for the drive mechanisms. On FIG. 3 there can be seen in particular hydraulic jack 6, its shaft 20 connected to base plate 3 by fastener 21, its fixing square 23 connected to frame 1, and an adjusting screw 22 of a mechanical stop 9. The position of base plate 3 of the slide is shown by broken lines.

Each runner 15 is connected to adjustment mechanisms intended to permit the precise adjustment of the prestressing of these runners, i.e. their permanent bearing pressure against the rails. In the embodiment shown, these means are formed for each runner by at least two and preferably four adjusting screws 24 housed in bores in base plate 3. This prestressing is regulated with a suitable tool, for example with a dynamometrical spanner or similar.

The essential advantage of this prestressing is to ensure gret guidance accuracy. It also permits the complete withdrawal of the slide and its repositioning without further adjustment being necessary, whilst complying with the guidance accuracy mentioned above.

Furthermore rails 12 are mounted on the frame with stops being used, which permits a completely constant distance between the rails to be obtained and, if necessary, to turn or replace the rails without any particular difficulties and without delicate adjustments being required.

The embodiment described above may undergo multiple modifications and refinements evident to a person skilled in the art, notably as regards the number and arrangement of the rails and of the runners. Similarly the drive mechanism by the hydraulic or the pneumatic jack 6 could be replaced by any other equivalent mechanism, for example a screw and ball nut mechanism arranged in the same way. The invention may also be applied to any machine tool or transfer unit having a travel slide, which is mobile horizontally or in any other direction.

Finally it will be noted that two to three travel slides conceived in accordance with the invention could be mounted one on top of the other to ensure combined movements along any plane or spatial trajectory.

We claim:

1. Travel device for a machine tool or a transfer machine, comprising:
    a frame provided with two parallel longitudinal components located on each side of a central passage and each provided with at least one longitudinal groove made in a lateral face located on the side opposite the other component,
    a slide mobile in travel, placed above said longitudinal components of the frame and provided with at least one pair of runners guided by balls and disposed opposite one another, each runner comprising a circuit of balls having a section along which the balls emerge laterally from the runner and are engaged in one of said grooves for guiding the slide,
    and means for displacing and positioning the slide along the frame, characterised in that the said longitudinal components of the frame comprise two separate rails (12), detachably fixed on the frame (1), and in that the slide (2) comprises control means for ensuring a prestressing of each runner guided by balls (15) in the groove (13) of the corresponding rail, towards the opposite runner.

2. Device according to claim 1, characterised in that the said lateral face (14) of the rail is substantially vertical.

3. Device according to claim 1, characterised in that the two rails (12) have the same cross section, and in that said section comprises said groove (13) on two opposite lateral faces of the rail.

4. Device according to claim 1, characterised in that the slide (2) comprises two pairs of said runners guided by balls (15).

5. Device according to claim 1, characterised in that the slide has a base plate (3) under which the runners guided by balls (15) are fixed, and in that the rails (12) extend beneath this upper plate.

6. Device according to claim 1, characterised in that said displacement and positioning means (6, 20) extend between the two rails (12).

7. Device according to claim 6, characterised in that the displacement and positioning means comprise a hydraulic or pneumatic jack (6).

8. Device according to claim 6, characterised in that the displacement and positioning means comprise a screw and a ball nut fixed beneath the slide.

* * * * *